United States Patent [19]

Tiedeman et al.

[11] Patent Number: 4,932,613
[45] Date of Patent: Jun. 12, 1990

[54] ROTARY HINGE ACTUATOR

[75] Inventors: Robert K. Tiedeman, Wayne; Arnold G. Seipel, Montville; William C. Leuze, Randolph, all of N.J.

[73] Assignee: Curtiss-Wright Flight Systems, Inc., Fairfield, N.J.

[21] Appl. No.: 211,345

[22] Filed: Jun. 24, 1988

[51] Int. Cl.⁵ .................................................. B64C 9/02
[52] U.S. Cl. .................................. 244/213; 74/89.16; 475/334; 475/342; 475/344
[58] Field of Search ............... 244/213, 75 R; 74/801, 74/768, 788, 424.5, 458, 89.16

[56] References Cited

U.S. PATENT DOCUMENTS

| | | | |
|---|---|---|---|
| 2,982,144 | 5/1961 | Wallgren | 74/458 |
| 3,008,355 | 11/1961 | Grudin | 74/801 |
| 3,333,482 | 8/1967 | Wildhaber | 74/458 |
| 3,486,394 | 12/1969 | Heidrich | 74/458 |
| 3,640,150 | 2/1972 | Leiner et al. | 74/801 |
| 4,721,016 | 1/1988 | Burandt | 74/801 |
| 4,742,730 | 5/1988 | Dorn et al. | 74/801 |
| 4,751,855 | 6/1988 | Hudson et al. | 74/801 |

Primary Examiner—Joseph F. Peters, Jr.
Assistant Examiner—Anne Sartelle

[57] ABSTRACT

A rotary hinge actuator, for instance for rotating a wing flap relative to a wing in an aircraft, has a sun gear, several spindle gears around the sun gear and several annular gear sleeves around the sun gear and spindle gears. Each spindle gear has sections with external helical gear teeth which are slanted in the same direction and which respectively mesh with internal helical gear teeth on the annular gear sleeves. At least one of the sleeves is connected to the wing and at least another to the wing flap. Upon rotating the spindle gears the wing flap is rotated relative to the wing.

12 Claims, 2 Drawing Sheets

ROTARY HINGE ACTUATOR

BACKGROUND OF THE INVENTION

The present invention relates to a rotary actuator for operating and/or driving a surface, such as a wing flap, rudder, or door in an aircraft. More specifically, it relates to a rotary helical hinge actuator which may consist of a single module or may employ multiple modules. Still further, the invention relates to a rotary helical hinge actuator using helical gear teeth in a balanced, multiple spindle gear arrangment in order to produce a maximum torque in a minimum space. This is particularly useful in operating a flap panel on a high speed airplane with thin wings, where the actuator provides torque to drive the flap panel as well as bearing support which transmits any shear loads back to the main structure of the plane.

BRIEF DESCRIPTION OF THE DRAWINGS

The invention will be explained with reference to the accompanying drawings in which:

FIG. 4 shows encircled part IV of FIG. 1 on an enlarged scale; and

FIGS. 5 and 6 are diagrammatic illustrations of a spindle gear and of internal helical gears meshing therewith.

DETAILED DESCRIPTION OF PREFERRED EMBODIMENTS

Figure 1:
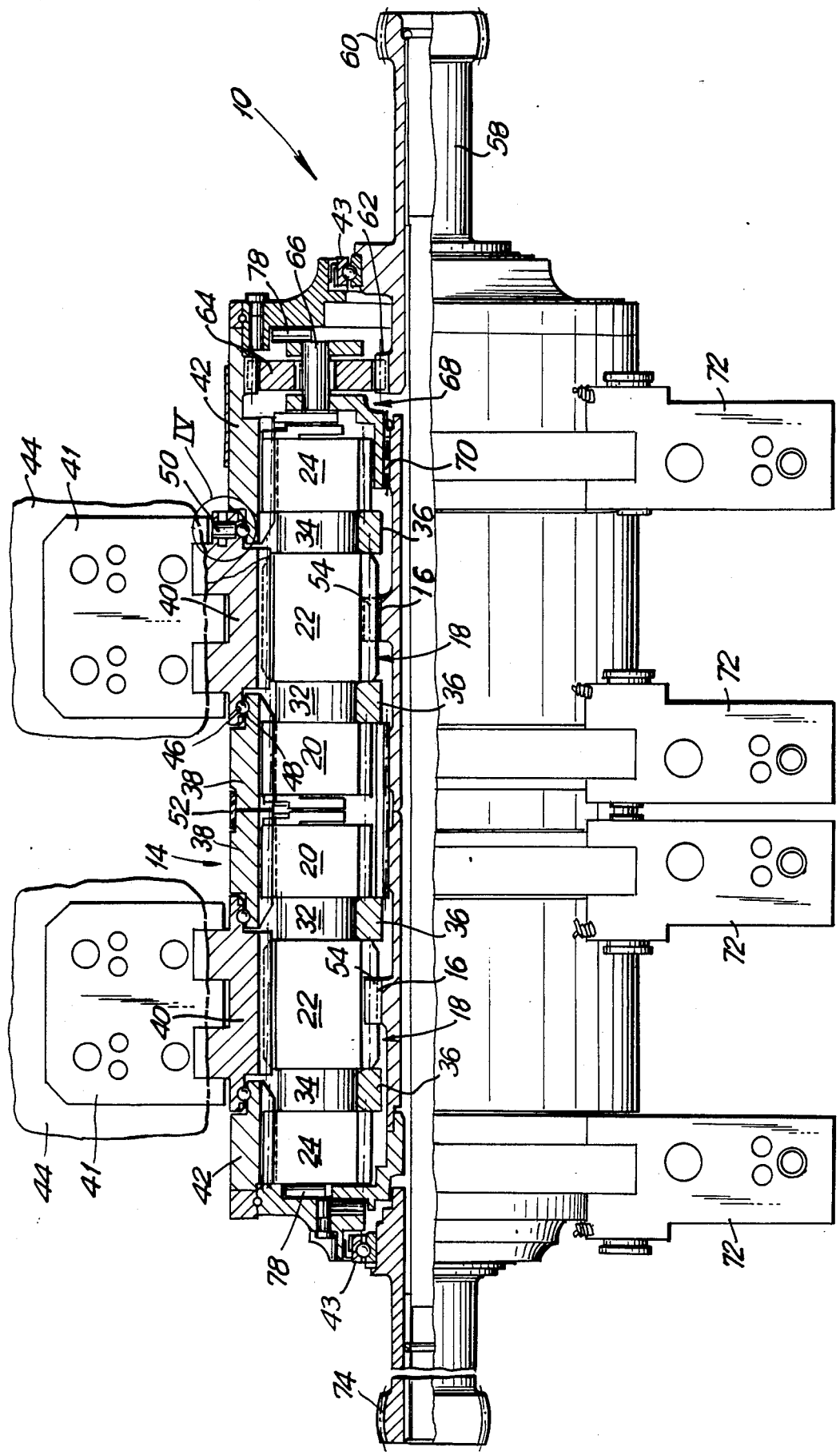
FIG. 1 is a partial longitudinal section through one embodiment of a rotary helical hinge actuator according to the present invention.
Figure 2:
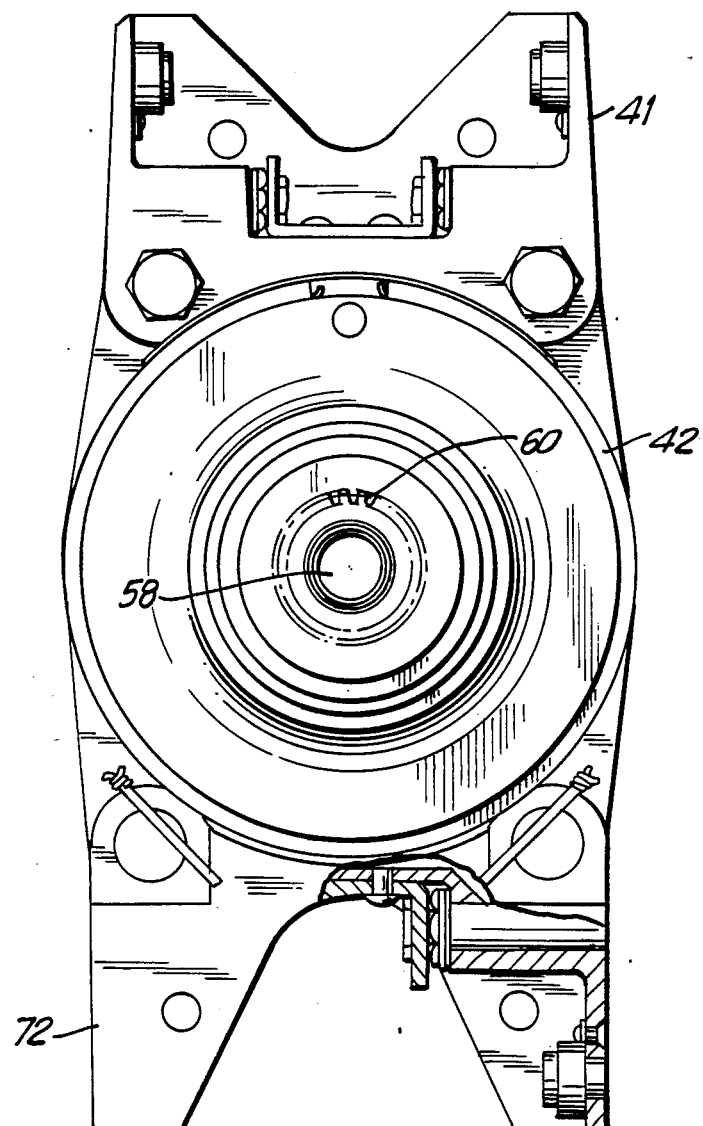
FIG. 2 is an end view of the actuator shown in FIG. 1.
Figure 3:
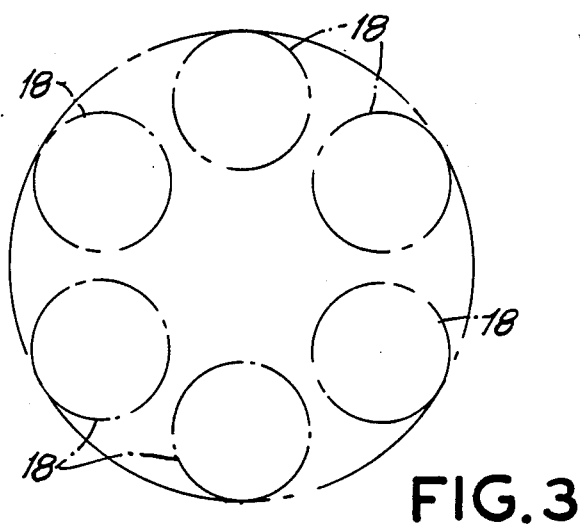
FIG. 3 is a schematic drawing illustrating the distribution of the spindle gears over the circumference of the actuator.

Referring to the drawing in detail the rotary helical hinge actuator 10 illustrated in FIG. 1 comprises two modules 12, 14. Each module comprises a sun gear 16 surrounded by a plurality of spindle gears 18, for instance six spindle gears 18. It is to be understood that the present invention is not limited to six such spindle gears. Depending on the circumstances there could be two, three, four, or more spindle gears.

Each spindle gear 18 comprises three spindle gear sections 20, 22, 24. The spindle gear sections are provided with slanted, helical gear teeth 26, 28, 30 respectively (FIG. 5). The teeth in all three sections are slanted in the same direction, but they are not necessarily arranged at identical angles. For instance, the angles A and C of gear sections 20 and 24 may be different from the gear angle B of section 22. Between the gear sections there are cylindrical or crowned surfaces 32, 34 on which rings 36 roll.

The spindle gear sections 20, 22, 24, mesh with internal gear sections 38, 40, 42 respectively.

The number of gear teeth on internal gears 38, 40 and 42 are selected to produce a desired gear reduction between input sun gear 16 and gears 38, 40, and 42.

Each spindle gear 18 is held in mesh with gears 38, 40 and 42 through the support of the rings 36. In the embodiment shown, the internal helical gears 38 and 42 are fixed, i.e. attached to the wing (not shown) of an aircraft, whereas internal helical gear 40 is movable, i.e. attached to a flap 44. It is to be understood that there may be only one module, or more than two modules.

Movable gear 40 is separated from the fixed gears 38, 42 by integrally machined ball races 46 with balls 48 illustrated in FIG. 4. Also shown is a ball retaining plug 50 closing the races and through which the balls may be introduced, and a seal 51 between the fixed and movable gears.

The two modules 12, 14 are sealed externally by a flexible sealing element 52 which permits relative motion between the modules.

It is of course to be understood that the arrangement could be different in that the previously described fixed internal helical gears 38 and 42 could be attached to the flap and the central gear 40 could be attached to wing structure. Sun gear 16 has gear teeth 54 which respectively mesh with the gear sections 22.

As mentioned above the helical gear teeth of sections 20, 22, 24 are all of the same hand but have slightly different helical angles which are selected to balance the thrust loads acting on the individual gears, i.e. the sun gear section 54, the fixed gear sections 38 and 42, and the movable gear section 40. They act to balance the net thrust load on any individual spindle gear 18. The load on the gear teeth trying to separate them are counteracted by the support rings 36 between the gear sections, and the thrust load on the internal gears are balanced by the integral ball bearing races 46 between the modules.

The total gear reduction may be selected so that the individual gear meshes are synchronous or non-synchronous. That is, for example, in a non-synchronous arrangement the six gear meshes of the spindle gears 18 to the output gear 40 are engaging teeth at different points along the gear tooth line of action. At any one instant, one spindle tooth may be entering initial mesh, the second spindle gear tooth will be one-sixth engaged, the third spindle gear tooth will be two-sixths engaged, the fourth spindle gear tooth will be three-sixths engaged, etc. To accomplish this, selective indexing is used and there are six different spindle gears in terms of indexing between positions of the fixed gear meshes to the output gear meshes.

In a synchronous arrangement, all spindle gear sections 20, 22, 24 engage the internal gear teeth sections 38, 40, 42 identically at any given time.

The axial thrust load from the helical sun gear 16 is counteracted at either end by roller thrust bearings 43. As an alternative, the thrust load of the sun gear could be absorbed at the support rings 36 and reacted at the bearing races 46. There is a center throughshaft 58 which extends through the modules 12, 14. This center throughshaft may be deleted if there is only one actuator.

The modules 12, 14 are driven by a planetary gearing including an input gear 60 which is preferably crowned to allow deflection in relation to the center throughshaft 58. It also includes a gear section 62 which meshes with three planatary gears 64, respectively mounted on shafts 66 which in turn are mounted on a carrier 68. This carrier has gear teeth 70 meshing with teeth on sun gear 16. Sun gear 16 is self-centering on the multiple planet gear mesh. Thus, deflection of either module due to wing bending will not apply excessive loads to the central throughshaft 58.

The movable gear sections 40 have lugs 41 to which wing flaps 44 are connected, whereas the fixed gears 38 and 42 carry lugs 72 for connection to the wing. The lugs allow some axial motion to occur between modules 12 and 14. This allows some realigning without bending parts of the actuator if the wing is bent.

Input gear 60 is at the inboard end of the hinge line. The module 14, or further modules (not shown) furthest from the inboard end at 60 are connected together by the shaft 58. The outboard modules 14 deflect furthest on the load which causes the inboard module 12 to carry more of the load. This load sharing is improved by having a high gear reduction at the final gear stage 38, 40, 42 of each module.

When more than two modules are used it may be desirable to drive the modules from both the inboard end at 60 as well as the outboard end at 74 to improve the division of the load across the several gear modules.

FIG. 5 diagrammatically illustrates the spindle gear 18. It is machined from a single piece of steel or other suitable material. The gear angles A and C may be selected to balance the thrust loads from the gear angle B. The gear teeth 26, 28 and 30 are loaded as shown by forces $P_1$, $P_2$ and $P_3$. Forces $P_1$ and $P_3$ oppose force $P_2$. The gear sections are on different pitch diameters. The helical gear angles A, B and C may be selected to obtain a balance in axial direction, and as mentioned above they may not be necessarily identical. The number of teeth 26 and 30 on gear sections 20 and 24 respectively, may be different from that of teeth 28 on section 22. The gear teeth 26 and 30 are machined to be in axial alignment, and the gear teeth 28 on gear section 22 are machined at a pre-determined angular position with respect to the gear teeth 26 and 30. The angular positioning is determined by the number of gear teeth used in order to obtain a pre-determined gear ratio.

All helical gears 26, 28, 30 may be crowned in order to minimize gear tooth corner loading. With reference to FIG. 6, the number of gear teeth on internal helical gears 38, 40 and 42 are selected to produce a gear reduction between the input sun gear 16 and the output of gears 38, 40 and 42.

The spindle gears 18 are held in mesh with the internal helical gears 38, 40, 42 through the support provided by the rings 36 rolling on surfaces 32, 34. During assembly the rings 36 are fitted such that a tight gear mesh is established between the gear spindles 18 and the internal helical gear sections 38, 40, 42.

Depending on the number of gear teeth selected to obtain a certain gear ratio, it may be necessary to vary the indexing on each spindle gear to achieve proper gear tooth meshing after assembly. That is, each spindle gear 18 in an assembly of six for example, may be different in indexing arrangement from the adjacent spindle gear, i.e. it has to be assembled in a predetermined pattern with its mating gears.

As was mentioned above, the gear tooth angles of the spindle gears may be selected to balance the thrust loads. However, the tooth angles must also be selected such that proper fitting is assured during assembly. The spindle gears 18 must be arranged around the support rings 36, the sun gear 16 and be inserted through the middle internal gear 40 in the correct angular relationship. The gear teeth on the gear sections 20, 24 may angularly interfere unless provision has been made when selecting the helical angles and gear tooth proportions properly. Obviously the helical gears will cause rotation of the internal helical gears as the spindle gears 18 are inserted during assembly.

The gear sections 38, 40, 42 are assembled with the balls 48 therebetween to form a bearing which withstands the gear thrust loads developed by the teeth on the internal sections. It should be kept in mind that the ball bearings are given as an example only but that other bearings, such as plain thrust bearings may be used.

End thrust plates 78 balance the thrust load on the sun gears 16. More specifically, the sun gears 16 thrust against the support rings 36 through the spindle gears 18 where it is reacted to by the thrust plates 78.

We claim:
1. A rotary hinge actuator comprising:
   sun gear means;
   a plurality of spindle gears surrounding said sun gear means; each spindle gear comprising a plurality of axially spaced gear sections fixed on a single shaft and provided with external helical gear teeth; the external helical gear teeth on said gear sections being slanted in the same direction;
   a plurality of annular gear sleeves arranged around said spindle gears and having internal helical teeth respectively meshing with said external helical gear teeth of said gear sections;
   at least one of said sleeves having connection means for connection to a movable element; at least another one of said sleeves having connection means for connection to an element stationary relative to said movable element;
   and means for rotating said spindle gears relative to said sun gear means and thereby said at least one sleeve relative to said at least another sleeve.

2. In an aircraft having a wing and a wing flap: a rotary hinge actuator comprising:
   sun gear means;
   a plurality of spindle gears surrounding said sun gear means; each spindle gear comprising a plurality of axially spaced gear sections fixed on a single shaft and provided with external helical gear teeth; the external helical gear teeth on said gear sections being slanted in the same direction;
   a plurality of annular gear sleeves arranged around said spindle gears and having internal helical teeth respectively meshing with said external helical gear teeth of said gear sections;
   at least one of said sleeves being connected to said wing flap;
   at least another one of said sleeves being connected to said wing;
   and means for rotating said spindle gears relative to said sun gear means and thereby said at least one sleeve and wing flap relative to said at least another sleeve and said wing.

3. A rotary hinge actuator according to claim 1 comprising six spindle gears and three sleeves; two of said sleeves having connection means for connection to said stationary element.

4. A rotary hinge actuator according to claim 2, comprising six spindle gears and three sleeves; two of said sleeves being connected to said wing.

5. A rotary hinge according to claim 1 or 2, wherein said external helical gear teeth are slanted at different angles on said plurality of spindle gears.

6. A rotary hinge according to claim 1 or 2, wherein said gear sections are separated from each other by bearing surfaces engaged by bearing rings supported on said sun gear means.

7. A rotary hinge actuator according to claim 1 or 2, comprising ball bearing means between said at least one and said at least one other sleeve.

8. A rotary hinge actuator according to claim 1 or 2, wherein said rotating means include input gear means, and planetary gear means interposed between said input gear means and said sun gear means.

9. A rotary hinge actuator according to claim 8, comprising shaft means for supporting said input gear means and said sun gear means.

10. A rotary hinge actuator according to claim 1 or 2, comprising a module design such that any gear tooth thrust loads are contained within said gear module.

11. A rotary hinge actuator comprising: at least two modules; each module comprising:
  sun gear means;
  a plurality of spindle gears surrounding said sun gear means; each spindle gear comprising a plurality of axially spaced gear sections fixed on a single shaft and provided with external helical gear teeth; the external hdelical gear teeth on said gear sections being slanted in the same direction;
  a plurality of annular gear sleeves arranged around said spindle gears and having internal helical teeth respectively meshing with said external helical gear teeth of said gear sections;
  at least one of said sleeves having connection means for connection to a movable element; at least another one of said sleeves having connection means for connection to an element stationary relative to said movable element;
  and means for rotating said spindle gears relative to said sun gear means and thereby said at least one sleeve relative to said at least another sleeve.

12. In an aircraft having a wing and a wing flap: a rotary hinge actuator comprising: at least two modules; each module comprising:
  sun gear means;
  a plurality of spindle gears surrounding said sun gear means; each spindle gear comprising a plurality of axially spaced gear sections fixed on a single shaft and provided with external helical gear teeth; the external helical gear teeth on said gear sections being slanted in the same direction;
  a plurality of annular gear sleeves arranged around said spindle gears and having internal helical teeth respectively meshing with said external helical gear teeth of said gear sections;
  at least one of said sleeves being connected to said wing flap;
  at least another one of said sleeves being connected to said wing;
  and means for rotating said spindle gears relative to said sun gear means and thereby said at least one sleeve and wing flap relative to said at least another sleeve and said wing.

* * * * *

UNITED STATES PATENT AND TRADEMARK OFFICE
CERTIFICATE OF CORRECTION

PATENT NO. : 4,932,613

DATED : June 12, 1990

INVENTOR(S) : Robert K. Tiedeman; Arnold G. Seipel; and William C. Leuze

It is certified that error appears in the above-identified patent and that said Letters Patent is hereby corrected as shown below:

In the drawing of the abstract and sheet 1, Fig. 1, the reference numeral 12 should be applied to the right hand module in the Figure; and the lead line for reference numeral 58 should be extended to the center of the center throughshaft 58, as shown in attached drawing Fig. 1.

On Sheet 1 of the drawing at the top "Sheet 1 of 2" should read --Sheet 1 of 3-- and on sheet 2 of the drawing at the top "Sheet 2 of 2" should read --Sheet 2 of 3--.

Under the abstract "2 Drawing Sheets" should read --3 Drawing Sheets--.

In column 2, line 48, "43" should read --78--.
In column 4, line 5, "plates 78" should read --bearings 78--;
lines 6 - 8, cancel "More specifically, the sun gears 16 thrust against the support rings 36 through the spindle gears 18 where it is reacted to by the thrust plates 78.".

Signed and Sealed this

Thirtieth Day of June, 1992

Attest:

DOUGLAS B. COMER

Attesting Officer   Acting Commissioner of Patents and Trademarks

UNITED STATES PATENT AND TRADEMARK OFFICE
CERTIFICATE OF CORRECTION

PATENT NO. : 4,932,613

DATED : June 12, 1990

INVENTOR(S) : Robert K. Tiedeman; Arnold G. Seipel; and William C. Leuze

It is certified that error appears in the above-identified patent and that said Letters Patent is hereby corrected as shown below:

In the Drawings, add the following Drawing Sheet, consisting of FIGS. 4-6.

Sheet 3 of 3

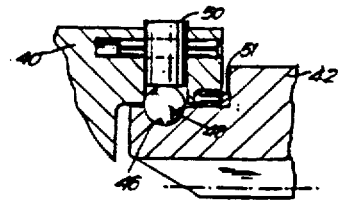

FIG.4

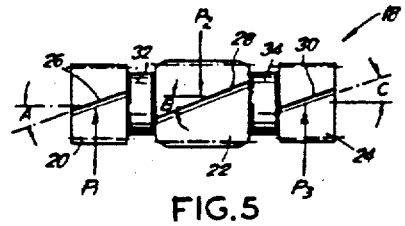

FIG.5

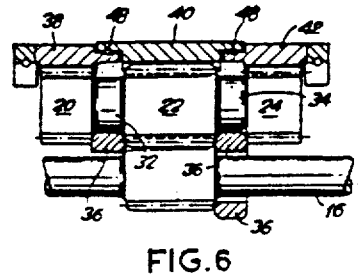

FIG.6